M. V. NOBLES.
Gridiron.
No. 97,217. Patented Nov. 23, 1869.
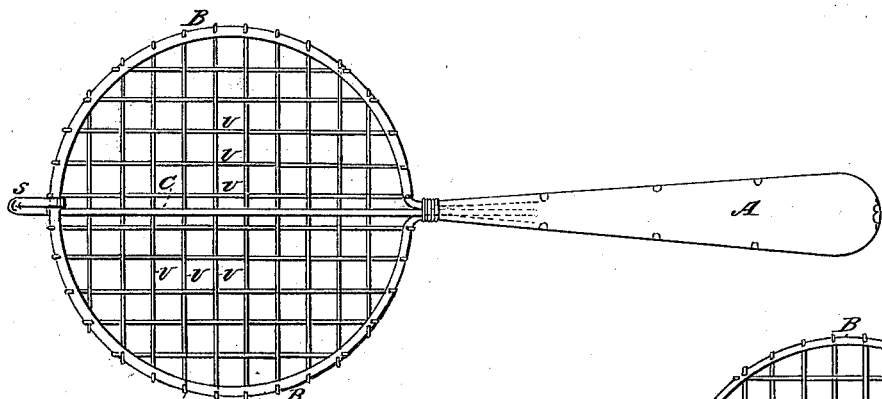
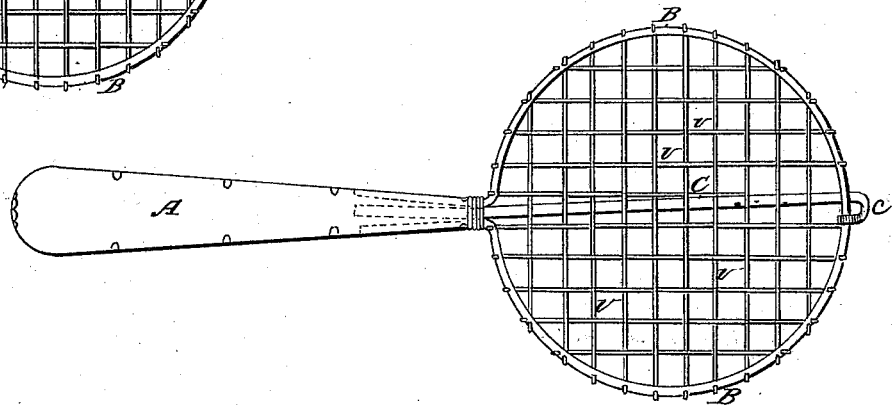
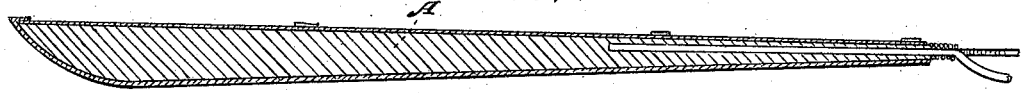
WITNESSES:
E. W. Anderson,
L. L. Kane.
INVENTOR:
M. V. Nobles
By Chipman Hosmer & Co
Attorneys.

United States Patent Office.

MILTON V. NOBLES, OF ELMIRA, NEW YORK.

Letters Patent No. 97,217, dated November 23, 1869.

GRIDIRON.

The Schedule referred to in these Letters Patent and making part of the same.

*To all whom it may concern:*

Be it known that I, MILTON V. NOBLES, of Elmira, in the county of Chemung, and State of New York, have invented a new and valuable Improvement in Gridirons; and I do hereby declare that the following is a full, clear, and exact description of the construction and operation of the same, reference being had to the annexed drawings, making a part of this specification, and to the letters and figures of reference marked thereon.

Figure 1, of the drawings, is a representation of one part of my invention in plan view.

Figure 2 is a similar representation of the other half of my invention.

Figure 3 is a central vertical section of my invention.

Figure 4 represents an enlarged section of the handle.

My invention has relation to cooking-utensils; and

It consists in certain improvements in the manufacture of gridirons, designed to render such articles more useful and efficient than has been possible by the ordinary methods of manufacture.

I construct my gridiron in two sections; represented on the drawings by figs. 1 and 2, of which A is the handle, and B, the circular or periphery wire, the united ends of which are secured in the handle in the manner shown.

This handle A is usually formed of tin, struck up by proper machinery, and filled with mortar of gypsum.

A horizontal wire, C, extends from the handle to the opposite side of the periphery wire, where, in one section, it is formed into a loop, $c$, and in the other into a tongue, $s$. When the two sections are united, the tongue $s$ is passed into the loop $c$.

The cross-wires $v$ are soldered to the periphery wire at the points of junction, my usual method of doing which is to clasp the cross-wires around the periphery wire, and then dipping the whole in melted tin.

Crimped wire is preferable in this manufacture of the cross-wires, such as is shown on fig. 3.

Each section of my gridiron is formed in the shape of a scoop or dish, as shown on fig. 3, the wires C forming a support or shield for the outer sides thereof.

The gypsum filling of the handles serves as a non-conductor of heat, and thereby renders said handles more generally useful than when manufactured in the ordinary manner, while the sections easily detachable are adapted for use either singly or united. For cleansing they should be detached.

In using my gridiron, I advise that the meat to be broiled be placed in the concave of one section, and that the other be united in the manner shown on fig. 3. Let the tongue $s$ be then rested on the stove, by one side of the opening or boiler-hole, and the handle on the other side thereof. The operator may now turn over the gridiron at will, without removing it from the boiler-hole.

If it be necessary to toast bread or broil meat with great rapidity, the sections may be used separately over the fire.

These gridirons may be made of an oblong shape, when desirable.

I claim the improved sectional gridiron herein described, provided with handles filled with mortar of gypsum, and having loop $c$ and tongue $s$, substantially as specified.

In testimony that I claim the above, I have hereunto subscribed my name, in the presence of two witnesses.

M. V. NOBLES.

Witnesses:
E. W. ANDERSON,
D. D. KANE.